United States Patent [19]

Kobayashi et al.

[11] Patent Number: 5,354,626
[45] Date of Patent: Oct. 11, 1994

[54] DISTRIBUTOR FOR A SOLID OXIDE FUEL CELL AND MANUFACTURING PROCESS THEREOF

[75] Inventors: Shozo Kobayashi; Akira Shiratori; Hiroshi Takagi; Yukio Sakabe, all of Nagaokakyo, Japan

[73] Assignee: Murata Manufacturing Co., Ltd., Nagaokakyo, Japan

[21] Appl. No.: 173,134

[22] Filed: Dec. 22, 1993

Related U.S. Application Data

[63] Continuation of Ser. No. 837,916, Feb. 20, 1992, abandoned.

[30] Foreign Application Priority Data

Feb. 22, 1991 [JP] Japan ................. 3-028134

[51] Int. Cl.$^5$ ............................................. H01M 8/10
[52] U.S. Cl. .................................. 429/30; 429/34
[58] Field of Search .............. 429/30, 32, 34, 38, 429/39

[56] References Cited

U.S. PATENT DOCUMENTS

| | | | |
|---|---|---|---|
| 3,012,086 | 12/1961 | Vahldieck. | |
| 3,526,549 | 9/1970 | Archer et al. | 136/86 |
| 3,554,808 | 1/1971 | Fischer et al. | |
| 4,564,427 | 1/1986 | Gruver et al. | 204/98 |
| 4,618,543 | 10/1986 | Matsumura et al. | 429/34 X |
| 4,721,556 | 1/1988 | Hsu | 204/258 |
| 4,799,936 | 1/1989 | Riley | 429/30 X |
| 4,812,329 | 3/1989 | Isenberg | 429/33 X |
| 4,847,173 | 7/1989 | Mitsunaga et al. | 429/41 |
| 4,929,517 | 5/1990 | Luoma et al. | 429/34 |
| 5,114,803 | 5/1992 | Ishihara et al. | 429/30 |
| 5,149,601 | 9/1992 | Shiratori et al. | 429/30 |
| 5,151,334 | 9/1992 | Fushimi et al. | 429/32 |

FOREIGN PATENT DOCUMENTS

| | | |
|---|---|---|
| 0361383A1 | 4/1990 | European Pat. Off. . |
| 0395975A1 | 11/1990 | European Pat. Off. . |
| 395975 | 11/1990 | European Pat. Off. . |
| 0460629A1 | 12/1991 | European Pat. Off. . |
| 3632701A1 | 6/1987 | Fed. Rep. of Germany . |
| 3907819A1 | 9/1990 | Fed. Rep. of Germany . |
| 4016157A1 | 12/1990 | Fed. Rep. of Germany . |
| 4016157 | 12/1990 | Fed. Rep. of Germany . |
| 4104838A1 | 8/1992 | Fed. Rep. of Germany . |
| 63-274062 | 11/1983 | Japan . |
| 1197972 | 8/1989 | Japan . |

OTHER PUBLICATIONS

"Overview of Planar SOFC Development at NCLI" from the Proceedings of the First Fabrication of Planar Solid Oxide Fuel Cell from the Proceedings of the 24 Inter-society Aug. 1989.

Primary Examiner—Anthony Skapars
Attorney, Agent, or Firm—Burns, Doane, Swecker & Mathis

[57] ABSTRACT

A distributor which is a component of a solid oxide Fuel cell and works to distribute a fuel gas or air to a fuel gas side electrode or an air side electrode evenly. A base of the distributor is porous, and the porous base is coated with a reinforcing agent and a conductive agent.

10 Claims, 5 Drawing Sheets

DISTRIBUTOR FOR A SOLID OXIDE FUEL CELL AND MANUFACTURING PROCESS THEREOF

This application is a continuation of U.S. patent application Ser. No. 07/837,916, filed Feb. 20, 1992 now abandoned.

BACKGROUND OF THE INVENTION

1. Field of the Invention

The present invention relates to a distributor which is a component of a solid oxide fuel cell.

2. Description of Related Art

A laminate type of solid oxide fuel cell is made by laminating cells with interconnectors in between, each of the cells comprising a solid electrolyte having mutually opposite surfaces having a fuel side electrode and an air side electrode respectively, and conductive distributors connected with the fuel side electrode and the air side electrode. In the solid oxide fuel cell, each distributor must have a structure which ensures electrical connection between an abutting interconnector and an abutting electrode and allows a fuel gas or air to pass therethrough.

A conventional type of distributor has a plurality of slits so that a fuel gas or air can pass therethrough. This distributor has an advantage in its transmission ability of air and a fuel gas, but has a disadvantage of decreasing an effective electrode area of a solid oxide fuel cell.. In addition, this distributor is susceptible to thermal stress, and it is likely to be broken by thermal stress when an electric current is generated.

Another conventional type of distributor has a porous base which is coated with a conductive agent. This distributor solves the disadvantages of the above-mentioned distributor. However, if the distributor is so made to have a higher porosity in order to improve its transmission ability of a fuel gas and air, its mechanical strength is decreased, and the distributor has a disadvantage in its poor durability.

SUMMARY OF THE INVENTION

An object of the present invention is to provide a conductive and porous distributor which has a high mechanical strength and increases an effective electrode area of a solid oxide fuel cell.

In order to attain the object, a distributor according to the present invention comprises a porous base which is coated with a reinforcing agent and a conductive agent. Even if the porosity of the distributor is increased, the reinforcing agent guarantees a high mechanical strength of the distributor. The conductive agent coated on the reinforcing agent guarantees a high conductivity of the distributor.

The distributor is produced in a method comprising the steps of: forming a reinforcing agent layer on a porous base by impregnating the porous base with a reinforcing slurry and removing an excess reinforcing slurry from the porous base; and forming a conductive agent layer on the reinforcing agent layer by impregnating the porous base having the reinforcing agent layer with a conductive slurry and removing an excess conductive slurry from the porous base. This method adopts impregnation which is simple and easy, and therefore the method is proper for mass production.

BRIEF DESCRIPTION OF THE DRAWINGS

This and other objects and features of the present invention will be apparent from tile following description with reference to the accompanying drawings, in which.

DETAILED DESCRIPTION OF THE PREFERRED EMBODIMENTS

An exemplary distributor for a solid oxide fuel cell and an exemplary manufacturing process of the distributor according to the present invention are hereinafter described with reference to the accompanying drawings.

Figure 1:
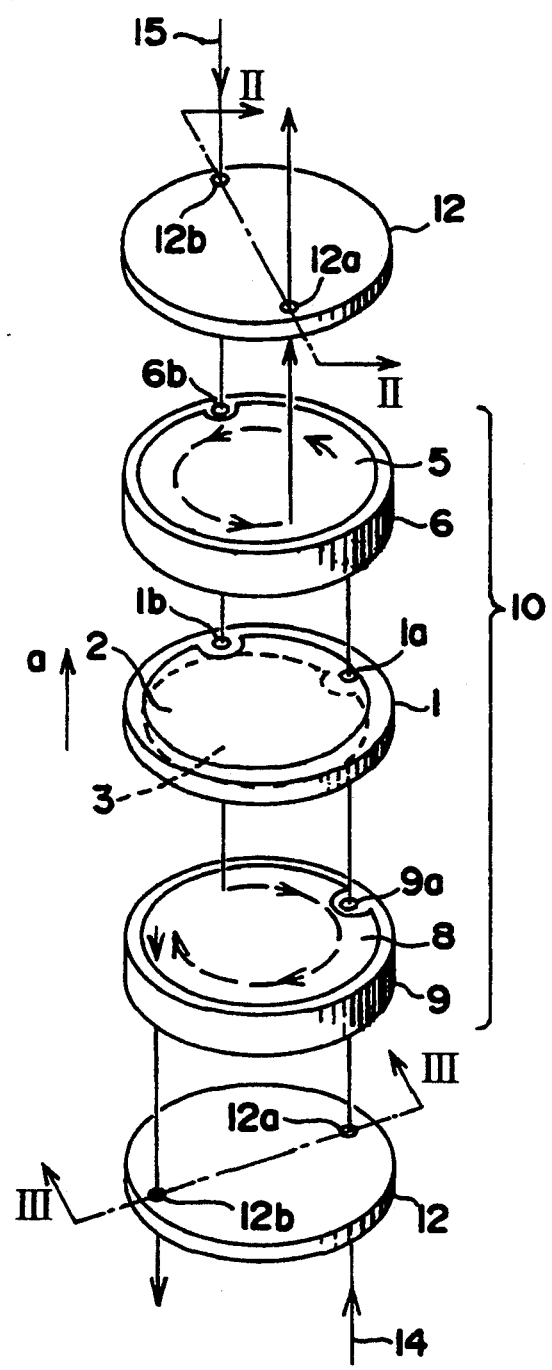
FIG. 1 is an exploded perspective view of a solid oxide fuel cell having distributors according to the present invention.
Figure 2:
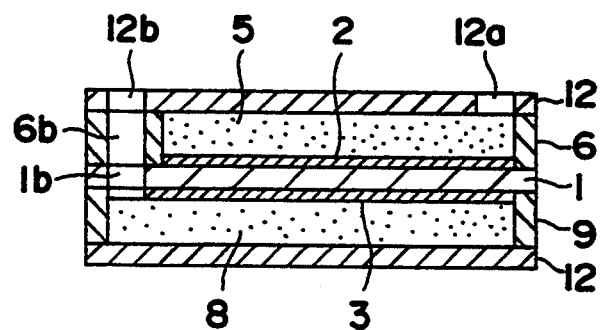
FIG. 2 is a vertical sectional view of the solid oxide fuel cell shown in FIG. 1, taken along a line II—II.
Figure 3:
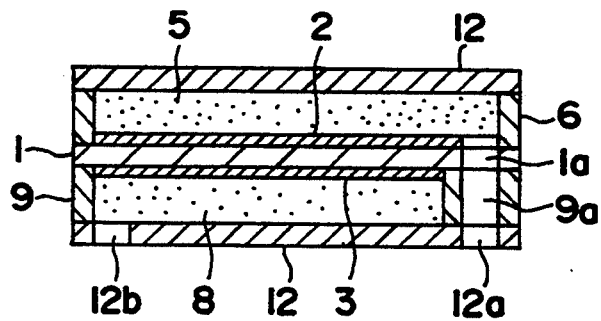
FIG. 3 is a vertical sectional view of the solid oxide fuel cell shown in FIG. 1, taken along a line III—III.

Referring to FIGS. 1, 2 and 3, an electrolyte 1 is shaped like a disk, and has a fuel gas through hole 1a which is a part of a fuel gas passage and an air through hole 1b which is a part of an air passage at its edge portion. The electrolyte 1 is made of yttrium stabilized zirconia or the like. A fuel side electrode 2 is provided on an upper surface of the electrolyte 1 so as not to cover the edge portion and the air through hole 1b but to cover the fuel gas through hole 1a. An air side electrode 3 is provided on a lower surface of the electrolyte 1 so as not to cover the edge portion and the fuel gas through hole 1a but to cover the air through hole 1b. In order to form the fuel side electrode 2, paste of a cermet such as a mixture of nickel and yttrium stabilized zirconia is coated on the upper surface of the electrolyte 1, and in order to form the air side electrode 3, paste of a conductive oxide material is coated on the lower surface of the electrolyte 1.

Figure 4:
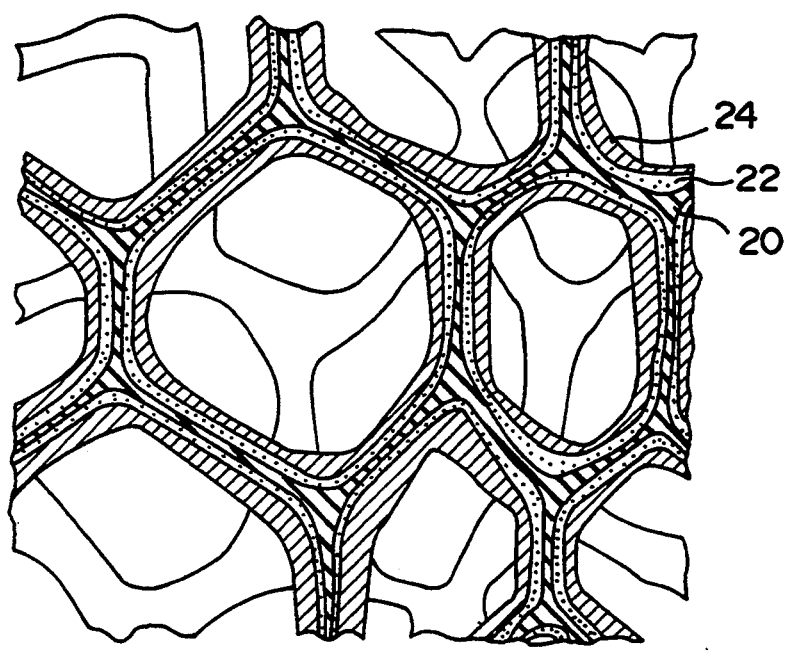
FIG. 4 is a partly enlarged sectional view of the distributor.

Disk-like conductive distributors 5 and 8, which have spacers 6 and 9 on their circumferences respectively, are connected with the air side electrode 2 and the fuel side electrode 3 respectively. As shown in FIG. 4, the distributors 5 and 8 are essentially made of a porous base 20 having a reinforcing agent layer 22 and a conductive agent layer 24 thereon. The spacers 6 and 9 are made of an insulating material and shield the distributors 5 and 8 from outside air. The spacer 6 has an air through hole 6b which is to communicate with the air through hole 1b, and the spacer 9 has a fuel gas through hole 9a which is to communicates with the fuel gas through hole 1a.

The solid electrolyte 1 and the distributors 5 and 8 are joined together such that the solid electrolyte 1 is between the distributors 5 and 8, and thus a disk-like cell 10 is assembled. Further, interconnectors 12 are provided on upper and lower surfaces of the cell 10. Each of the interconnectors 12 has an air through hole 12b and a fuel gas through hole 12a on its edge portion such that the through holes 12a and 12b are opposite each other. The interconnectors 12 are joined to the cell 10 such that the air through hole 12b of the upper interconnector 12 communicates with the air through hole 6b and that the fuel gas through hole 12a of the lower interconnector 12 communicates with the fuel gas through hole 9a. Thus, the disk-like cell 10 is provided with the interconnectors 12 on its upper and lower surfaces.

Next, operation of the cell 10 thus assembled is hereinafter described.

A fuel gas 14 flows upward to the distributor 5 through the fuel gas through hole 12a of the lower interconnector 12, the fuel gas through hole 9a of the spacer 9 and the fuel gas through hole 1a of the solid electrolyte 1. The distributor 5 distributes the fuel gas 14 to the fuel side electrode 2 evenly.

Meanwhile, air 15 flows downward to the distributor 8 through the air through hole 12b of the upper interconnector 12, the air through hole 6b of the spacer 6 and the air through hole 1b of the solid electrolyte 1, and the distributor 8 distributes the air 15 to the air side electrode 3 evenly. The temperature inside the cell 10 is maintained high (600°–1200° C.), and the air 15 distributed to the air side electrode 3 and the fuel gas 14 distributed to the fuel side electrode 2 react to each other via the solid electrolyte 1, thereby causing an electric current to flow in a direction of the thickness of the cell 10 (direction indicated by arrow a in FIG. 1). The electric current flows outward through the upper interconnector 12. The fuel gas 14 and the air 15 after the reaction are exhausted from the fuel gas through hole 12a of the upper interconnector 12 and from the air through hole 12b of the lower interconnector 12 respectively.

A fuel cell is made by laminating several disk-like cells 10 with interconnectors in between.

Figure 5:
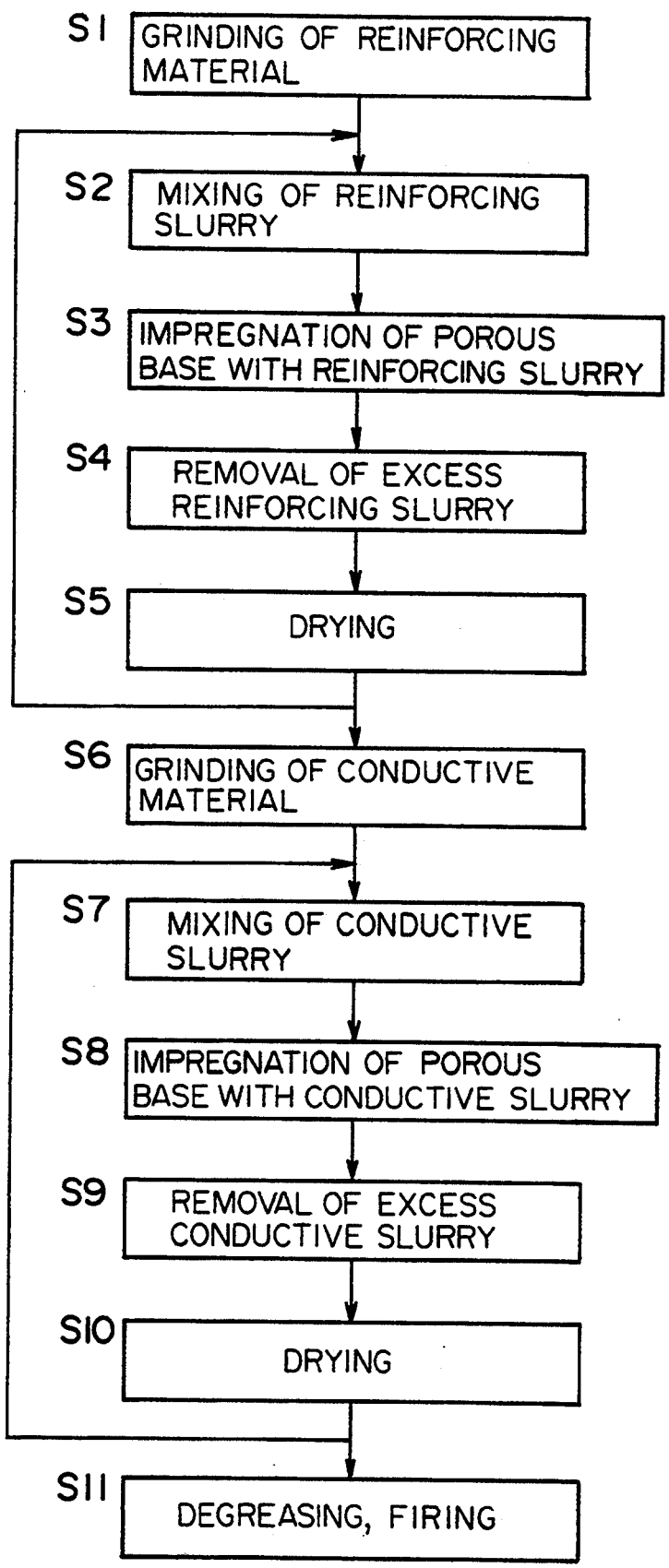
FIG. 5 is a flowchart showing a distributor production method according to the present invention.

A method of producing the distributors 5 and 8 which are components of the fuel cell is hereinafter described. FIG. 5 is a flowchart showing steps of the method.

First, at step S1, a reinforcing material such as yttrium stabilized zirconia, which is also used for the solid electrolyte 1, is put into a bowl mill together with a solvent such as toluene, and the reinforcing material is wet-ground. After the wet grinding of the reinforcing material, at step S2, a binder, preferably an acrylic binder, is added so that the material is wet-mixed with the binder into a reinforcing slurry.

Next, the porous base 20 is impregnated with the reinforcing slurry at step S3. The porous base 20 is, for example, a disk-like piece which is 33–120 mm in diameter and 5 mm in thickness of soft polyurethan foam without cell walls. At step S4, an excess slurry is removed from the porous base 20. At step S5, the reinforcing slurry which is entirely coated on the porous base 20 is dried at a temperature of 60° C. to form a reinforcing agent layer 22. Steps S2–S5 are repeated until the reinforcing agent layer 22 grows to have a predetermined thickness.

Next, at step S6, a conductive material, for example, lanthanum manganite powder prefired at a temperature of 1100° C., such as $(La,Sr)MnO_3$ or $(La,Sr)(Mn,Cr)O_3$, is put into a bowl mill together with a solvent such as toluene, and the conductive material is wet-ground. After the wet grinding of the conductive material, at step S7, a binder, preferably an acrylic binder, is added so that the conductive material is wet-mixed with the binder into a conductive slurry.

Next, the porous base 20 having the reinforcing agent layer 22 thereon is impregnated with the conductive slurry at step S8, and an excess slurry is removed from the porous base 20 at step S9. At step S10, the conductive slurry which is entirely coated on the reinforcing agent layer 22 is dried at a temperature of 60° C. to form the conductive agent layer 24. Steps S7–S10 are repeated until the conductive agent layer 24 grows to have a predetermined thickness. Thereafter, at step S11, the porous base 20 having the reinforcing agent layer 22 and the conductive agent layer 24 is degreased at a temperature of 400° C. and fired at a temperature of 1400° C.

Table 1 shows characteristics of the distributors 5 and 8 thus assembled. Table 1 also shows characteristics of conventional distributors for comparison.

TABLE 1

| Distributor | porosity (%) | resistance ($\Omega$/cm) | mechanical strength (kg/cm$^2$) | coefficient of thermal expansion ($\times 10^{-6}$cm/°C.) |
|---|---|---|---|---|
| with a $(La,Sr)MnO_3$ conductive layer and a yttrium stabilized zirconia (YSZ) layer | 89 | 0.09 | 10.2 | 10.8 |
| with a $(La,Sr)(Mn,Cr)O_3$ conductive layer and a YSZ layer | 89 | 0.10 | 9.7 | 10.7 |
| Comparison Example 1 with a $(La,Sr)MnO_3$ conductive layer | 90 | 0.06 | 0.1 | 11.8 |
| Comparison Example 2 with a $(La,Sr)(Mn,Cr)O_3$ conductive layer | 90 | 0.07 | 0.1 | 11.2 |

According to Table 1, the distributors 5 and 8 have substantially the same porosity as that of the conventional distributors. Since the distributors 5 and 8 do not have cell walls, their resistances to the fuel gas 14 and the air 15 are small, that is, pressure losses of the fuel gas 14 and the air 15 in the distributors 5 and 8 are small. Conductivities of the distributors 5 and 8 are excellent, and their mechanical strengths are much better than those of the conventional distributors. A coefficient of thermal expansion of the solid electrolyte 1 is $10.5 \times 10^{-6}$cm/° C. Differences of coefficients of thermal expansion between the solid electrolyte 1 and the distributors 5 and 8 are smaller than those between the solid electrolyte 1 and the conventional distributors. Accordingly, a solid oxide fuel cell having the solid electrolyte 1 and the distributors 5 and 8 works more reliably under thermal stress than a solid oxide fuel cell having the solid electrolyte 1 and the conventional distributors.

Although the present invention has been described in connection with the preferred embodiment above, it is to be noted that various changes and modifications are possible to those who are skilled in the art. Such changes and modifications are to be understood as being within the scope of the invention.

Figure 6:
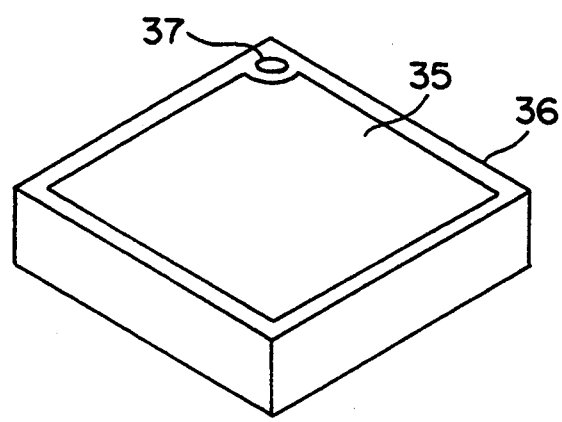
FIG. 6 is a perspective view of another distributor according to the present invention.

The solid electrolyte does not have to be made into a disk shape, and accordingly the distributors may not be shaped into a disk. For example, if the solid electrolyte is shaped into a rectangle, a rectangular distributor 35 as shown in FIG. 6 should be used. In FIG. 6, numeral 36 denotes a spacer, and numeral 37 denotes an air through hole or a fuel gas through hole. Thus, the distributors may be made into any shape according to the shape of the solid electrolyte.

What is claimed is:

1. A distributor for a solid oxide fuel cell, the solid oxide fuel cell having an electrolyte sandwiched between a fuel side electrode and an air side electrode the distributor being in contact with the fuel side electrode and the air side electrode for receiving both fuel and air, respectively said distributor comprising:
   a porous base;
   a reinforcing agent layer on the porous base; and
   a conductive agent layer on the reinforcing agent layer.

2. The distributor of claim 1, wherein the porous base is soft polyurethane foam without cell walls.

3. The distributor of claim 1, wherein the reinforcing agent layer is made of yttrium stabilized zirconia.

4. The distributor of claim 1, wherein the conductive agent layer is made of a substance of which main constituent is $(La,Sr)(Mn,Cr)O_3$.

5. The distributor of claim 1, wherein the conductive agent layer is made of a substance of which main constituent is $(La,Sr)MnO_3$.

6. The distributor of claim 1, wherein the distributor is shaped like a disk.

7. The distributor of claim 1, wherein the distributor is rectangular.

8. A distributor according to claim 1, wherein said reinforcing agent layer is formed from a material used to form a solid electrolyte of the solid oxide fuel cell.

9. A distributor of claim 1, wherein a coefficient of thermal expansion of the distributor is less than $11 \times 10^{-6}$ cm/° C.

10. A distributor of claim 1, wherein a coefficient of thermal expansion of the distributor is less than $11 \times 10^{-6}$ cm/° C., and a coefficient of thermal expansion of a solid electrolyte in the solid oxide fuel cell is approximately $10.5 \times 10^{-6}$ cm/° C.

* * * * *